United States Patent
Gotz et al.

(10) Patent No.: US 8,540,163 B2
(45) Date of Patent: Sep. 24, 2013

(54) PERSONALIZATION OF CARD-SHAPED DATA CARRIERS

(75) Inventors: Thomas Gotz, Markt Schwaben (DE); Thomas Schneider, Munich (DE); Lucas Perlitz, Munich (DE)

(73) Assignee: Giesecke & Devrient GmbH, Munich (DE)

( * ) Notice: Subject to any disclaimer, the term of this patent is extended or adjusted under 35 U.S.C. 154(b) by 0 days.

(21) Appl. No.: 13/388,570

(22) PCT Filed: Aug. 2, 2010

(86) PCT No.: PCT/EP2010/061184
§ 371 (c)(1),
(2), (4) Date: Feb. 2, 2012

(87) PCT Pub. No.: WO2011/015546
PCT Pub. Date: Feb. 10, 2011

(65) Prior Publication Data
US 2012/0132720 A1    May 31, 2012

(30) Foreign Application Priority Data

Aug. 3, 2009  (DE) .................... 10 2009 035 939

(51) Int. Cl.
*G06K 19/06* (2006.01)
(52) U.S. Cl.
USPC ............ 235/492; 235/380; 235/487; 235/375
(58) Field of Classification Search
USPC ................. 235/492, 380, 375, 487, 451, 483
See application file for complete search history.

(56) References Cited

U.S. PATENT DOCUMENTS

| | | | |
|---|---|---|---|
| 5,145,548 A * | 9/1992 | Yamamoto | 156/350 |
| 6,283,368 B1 * | 9/2001 | Ormerod et al. | 235/380 |
| 6,394,346 B1 * | 5/2002 | Bonneau et al. | 235/438 |
| 2004/0112951 A1 | 6/2004 | Berndtsson | |
| 2004/0220696 A1 | 11/2004 | Medioni et al. | |
| 2005/0218212 A1 * | 10/2005 | Berthe | 235/380 |
| 2008/0266105 A1 | 10/2008 | Brod et al. | |

FOREIGN PATENT DOCUMENTS

| | | |
|---|---|---|
| DE | 60320377 T2 | 8/2003 |
| DE | 10 2005 035 848 A1 | 12/2006 |
| DE | 10 2006 020 227 A1 | 11/2007 |
| EP | 1 420 361 A1 | 5/2004 |
| EP | 1 698 999 A1 | 9/2006 |
| WO | 01/41087 A1 | 6/2001 |

OTHER PUBLICATIONS

International Search Report and Written Opinion issued in international application PCT/EP2010/061184, Nov. 19, 2012, 9 pages.

* cited by examiner

*Primary Examiner* — Edwyn Labaze
(74) *Attorney, Agent, or Firm* — Bacon & Thomas, PLLC

(57) ABSTRACT

In a method and an apparatus for personalizing card-shaped data carriers (10, 11, 12), for example chip cards in the formats ID000 to ID3 or other suitable formats, a card-shaped data carrier (10, 11, 12) to be personalized is transported by means of a transport device within the apparatus. During the transport motion, personalization data are transferred to an electronic storage device (13) of the card-shaped data carrier (10, 11, 12) by means of a personalization device (40). The transporting of the card-shaped data carrier (10, 11, 12) is effected by means of a band-shaped or tubular carrier (20, 21, 22, 23) on which a multiplicity of card-shaped data carriers (10, 11, 12) to be personalized are arranged one behind the other in the transport direction.

19 Claims, 6 Drawing Sheets

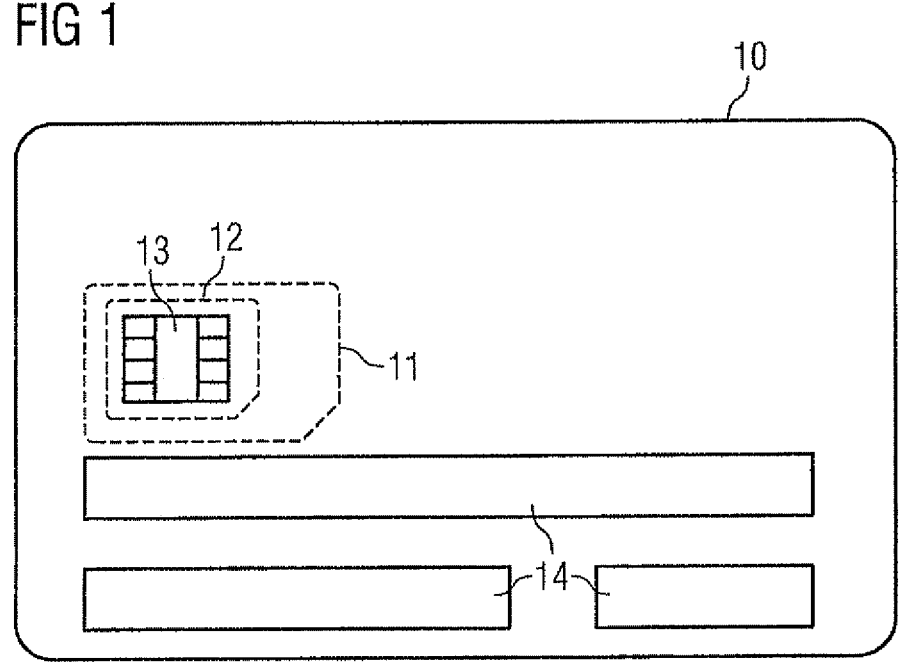

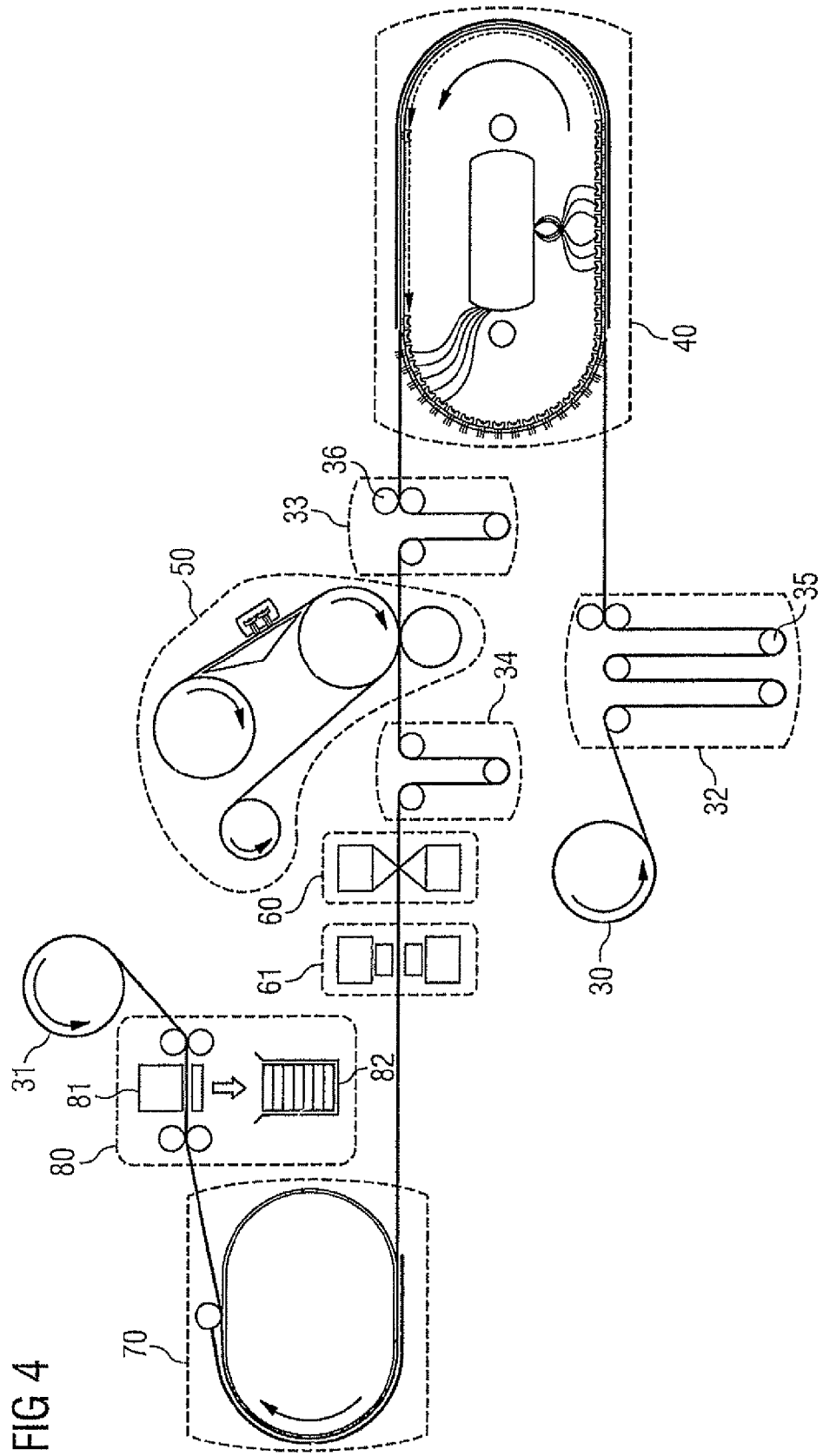

PERSONALIZATION OF CARD-SHAPED DATA CARRIERS

A. BACKGROUND FIELD

The present invention relates to a method and an apparatus for personalizing card-shaped data carriers, in particular chip cards.

B. RELATED ART

Card-shaped data carriers for the purposes of the present invention are for example chip cards in the ID1 format, but also in other formats such as ID000 to ID3 including intermediate formats or in other suitable formats, as well as in the mini-UICC format, for example SIM cards or plug-ins, and other card-shaped data carriers on which data can be stored digitally on a storage device.

A personalization can comprise both the electronic and the optical personalization of card-shaped data carriers, whereby the present invention deals primarily with electronic personalization. Personalization refers here to all processes that are applied in order to individualize a multiplicity of data carriers which initially have like electronic and/or optical properties. In electronic personalization, individual data, hereinafter referred to as personalization data, are transferred to an electronic storage device of a card-shaped data carrier. Additionally or alternatively, card-shaped data carriers can be subjected to optical personalization, by applying visually recognizable personalization information to the data carriers, for example incorporating it by means of a laser or printing it by means of printing methods. The optical personalization information can be perceived and checked by the human eye, whereas the electronic personalization data are read out from the storage device by corresponding reading devices.

Before personalization, the card-shaped data carriers are usually first produced in their final form. Subsequently to the completion of the body of the card-shaped data carriers, a sequential personalization of the data carriers is effected, that is, the card-shaped data carriers are supplied to an apparatus for personalization successively as individual objects. In so doing, each data carrier is transported and oriented individually in the apparatus in order to transfer the corresponding personalization data to each data carrier. After the transferring of the personalization data, the individual data carriers are combined into stacks again.

DE 10 2006 020 227 A1 describes such a method for personalizing electronic data carriers by means of a personalization machine, whereby for personalization the electronic data carriers are transported individually by means of workpiece carriers. The workpiece carriers comprise an intelligent control, so that the personalization of the data carriers can be carried out autonomously by the workpiece carriers. For this purpose, personalization data are requested from a central management system and transferred via suitable interfaces to a workpiece carrier and to a data carrier located in said workpiece carrier. The transferring of the personalization data is effected during transport by means of the workpiece carriers.

WO 01/41087 A1 likewise describes a method for personalizing card-shaped data carriers, whereby the personalization data are transferred from a host computer first to an initialization and/or personalization system and stored temporarily. Furthermore, initialization data which are identical for a multiplicity of data carriers can likewise be stored temporarily there. The temporarily stored data are then transferred from the personalization system to the corresponding data carriers. Due to the temporary storage, the data traffic with the host computer is reduced.

In DE 603 20 377 T2 there are described a card personalization system and a corresponding method. The data carriers to be personalized are input to an input funnel of a personalization apparatus individually or bundled in a stack. From there each data carrier individually runs through different processing modules, such as a magnetic-stripe module, laser module, graphics module or embossing module, which are provided for electronically and/or optically personalizing the data carriers. After processing, the data carriers are collected in an output funnel, so that they can be withdrawn by an operator.

In known methods for personalizing card-shaped data carriers, the personalization process is limited in its processing speed, for example to approximately 1,500 to 5,000 units per hour. Further, there can occur optical defects on the surfaces of the data carriers upon the handling of the data carriers. Moreover, the personalization apparatuses are adapted only for the handling of certain data carrier formats.

Hence, the object of the present invention is to improve, in particular to accelerate, the personalization of card-shaped data carriers, and also to improve the flexibility upon the personalization of card-shaped data carriers of different formats.

SUMMARY OF THE INVENTION

According to the invention, the transporting of the card-shaped data carriers is effected by means of a band-shaped or tubular carrier as the transport medium. On the band-shaped or tubular carrier there are arranged one behind the other in the transport direction a multiplicity of card-shaped data carriers to be personalized.

Because the transport of the data carriers is effected on the band-shaped or tubular carrier upon the transferring of the personalization data, a continuous processing of the card-shaped data carriers is possible. The card-shaped data carriers to be personalized need not be handled individually, so that a considerably higher processing speed can be reached. Also, on account of this kind of handling the danger of optical defects being caused on the data carrier surfaces is reduced, in particular in the case of a tubular carrier wherein the data carriers are received completely or partly within the tube. In this way, considerable costs can also be saved upon the personalization of card-shaped data carriers. For since the feed of the card-shaped data carriers is effected on the band-shaped carrier and the personalization apparatus therefore need not be highly specialized to a particular form factor, different form factors can be personalized much more flexibly with the same apparatus.

A band-shaped or tubular carrier is understood in this connection to be a carrier that has a substantially greater dimension in its length than in its width and can thus receive a multiplicity, for example more than 50, 100, 500 or 1000, of card-shaped data carriers arranged one behind the other. Such a carrier is also referred to as an endless carrier, whereby a person skilled in the art will understand an endless carrier to be a quasi-endless carrier, which does have a beginning and an end but is considered endless on account of its length. Such endless carriers can be made available on a roller from which they are unwound and supplied to the process.

The endless carrier can already arise upon the production of the bodies of the card-shaped data carriers, for example upon the lamination of the different layers of a data carrier. In this case, the card-shaped data carriers form a part of the endless carrier. Optionally, a perforation of the endless carrier can be provided between the individual data carriers. However, the card-shaped data carriers can also first be produced to completion in conventional fashion and then be applied to the endless carrier separately one behind the other. It is also conceivable to arrange several rows of card-shaped data carriers arranged one behind the other in the transport direction, side by side on the endless carrier.

For transferring the personalization data to the electronic storage device of a card-shaped data carrier, the personalization device has interfaces via which a contact-type or contactless communication with the card-shaped data carriers is possible. To guarantee a continuous processing, the interface moves at the same speed as the transported card-shaped data carrier. The personalization thus takes place during the transport motion of the card-shaped data carrier, without the process having to be stopped. In this way there can be achieved a high processing speed.

Advantageously, the interface moves in an endless loop, for example on a chain, in the personalization device. The endless carrier with the card-shaped data carriers to be personalized is guided along the endless loop, in particular guided around the endless loop. The interfaces can move for example along the circumference of the personalization device. They are in a communication link with the card-shaped data carriers in contact-type or contactless fashion as long as the latter are being guided along the personalization device. For this duration the personalization data can be transferred completely to the card-shaped data carriers.

Advantageously, the transferring of the personalization data is effected at least partly simultaneously to several card-shaped data carriers. In particular, the simultaneous transfer of the personalization data is effected at least partly simultaneously to those data carriers that are arranged on the endless carrier one behind the other in the transport direction. For several neighboring data carriers, the transfer of the personalization data can, in so doing, be effected completely simultaneously. However, if the transfer of the personalization data to the corresponding card-shaped data carriers begins in accordance with their contacting order with the interfaces of the personalization device, the transfer of the personalization data is first completed to that data carrier that was first contacted by the corresponding interface. The transfer of the personalization data to the data carriers following said data carrier is then effected with a time shift in accordance with the onset of their respective contacting with the interface of the personalization device. The transfer of the personalization data to the card-shaped data carriers arranged one behind the other in the transport direction thus overlaps in time.

The interfaces of the personalization device are connected to a terminal device which draws the personalization data from a data source. To make possible a continuous loop-shaped motion of the interfaces, the interfaces are advantageously connected to the terminal device via sliding contacts. The interfaces can also be firmly connected to the terminal device, whereby in this case the terminal device co-rotates in the moving direction of the interfaces. The terminal device then draws the personalization data from the data source contactlessly via a contactless interface, e.g. via an optocoupler.

If a card-shaped data carrier is recognized as defective by the personalization device for example, it is advantageously eliminated or replaced by an operable data carrier. For this purpose there is arranged after the personalization device in the transport direction a device for re-producing faulty data carriers. Said device detaches a data carrier recognized as faulty from the endless carrier and replaces the respective detached data carrier by a data carrier to which the corresponding personalization data have been correctly transferred. Said transfer of the personalization data can be effected in the re-producing device in which a stock of card-shaped data carriers can also be made available as replacements. Further, the re-producing device can have a collecting device for the detached, faulty data carriers.

Advantageously, in addition to the above-described electronic personalization there can also be performed an optical personalization of the card-shaped data carriers. This is effected by applying visually recognizable personalization information to the data carriers. The application of the personalization information can be effected for example by means of a laser or by printing.

Advantageously, the personalization data transferred to the card-shaped data carrier are compared for matches with the visually recognizable personalization information applied to the data carrier. This can be effected in a device for checking the plausibility of the personalization, which can be constructed analogously to the personalization device. In particular, the readout for the purpose of checking for plausibility is effected during the transport motion while the endless carrier is being guided past the checking device. The process thus does not need to be stopped for checking the plausibility of the personalization either.

DESCRIPTION OF THE DRAWINGS

The invention will be described hereinafter by way of example with reference to the accompanying drawings. Therein are shown:

FIG. 1 a card-shaped data carrier schematically in plan view,

DETAILED DESCRIPTION OF EXEMPLARY EMBODIMENTS

Figure 2A:
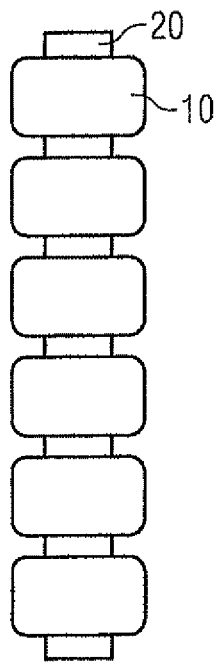
FIGS. 2a to 3b different embodiments of band-shaped endless carriers with card-shaped data carriers arranged thereon, FIG. 4 a schematic representation of an apparatus for personalizing card-shaped data carriers, FIG. 5 a schematic representation of a personalization device of the apparatus from FIG. 4 according to a first variant, FIG. 6 a second variant of the personalization device, and FIG. 7 a schematic representation of a device for re-producing faulty data carriers.

In FIG. 1 there is represented a card-shaped data carrier 10 to be personalized, in the form of a chip card in the ID1 format. The data carrier 10 has a storage device 13 in the form of a chip with suitable contact areas on which electronic personalization data can be stored. Further, there are provided on the data carrier 10 regions 14 which can have visually recognizable personalization information, for example the name of the card owner, the card number or other individual data. Additionally, there can be applied, for example printed, on the surface of the data carrier 10, that is, on the front side and/or back side of the data carrier 10, further, arbitrary personalization information, such as a photo of the card owner, logos and the like.

In FIG. 1 there are furthermore indicated by dash lines further card-shaped data carriers in the ID000 format 11 and in the mini-UICC format 12. These small-sized data carriers 11, 12 likewise have the chip 13 with contact areas, to which the personalization data are transferred and stored. There can likewise be applied to the surface of the small-sized data carriers 11, 12 personalization information that is visually perceptible.

In FIG. 2a there is represented an endless carrier in the form of a carrier band 20 on which card-shaped data carriers 10 are arranged one behind the other. The carrier band 20 has a smaller width than the data carriers 10. The data carriers 10 in this embodiment example are fastened, for example bonded, to the carrier band 20 in order for the data carriers 10 to be able to be supplied to the personalization process continuously.

Figure 2B:
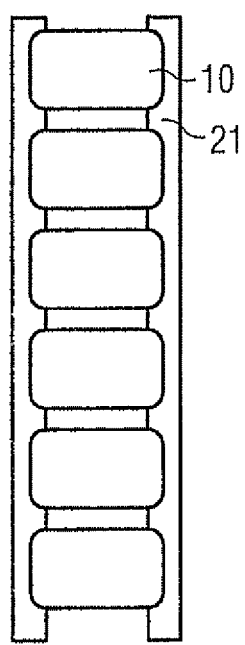
Figure 2C:
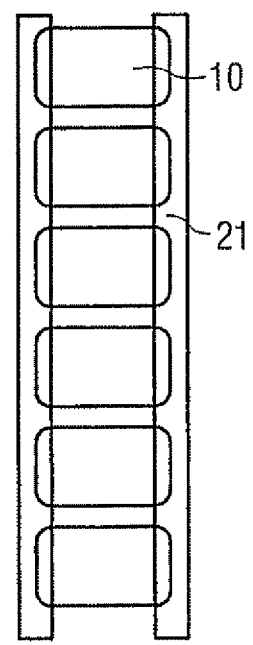

FIG. 2b shows a further embodiment example of a carrier band 21 on which data carriers 10 are arranged one behind the other. The data carriers 10 are connected on both sides at their edges to the carrier band 21. The carrier band 21 is configured only at the edges of the data carriers 10, possibly with intermediate bars in the region of the data carriers 10, so that material can be saved. The data carriers 10 can for example again be bonded to the carrier band 21. In FIG. 2c there is represented the carrier band 21 with data carriers 10 arranged thereon, whereby the data carriers 10 are welded to the carrier band 21 laterally here.

Figure 3A:
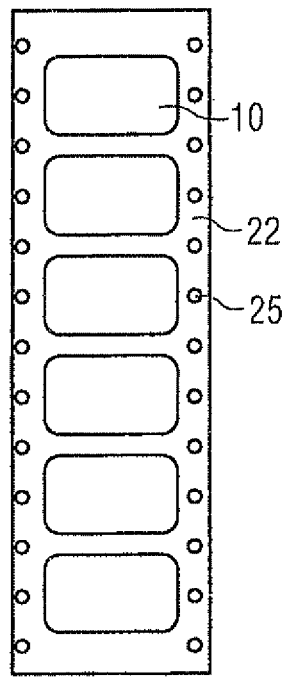

In FIG. 3a there is represented yet a further embodiment example of a carrier band 22. Here the data carriers 10 are part of the carrier band 22, which has holes 25 at both edges for exact transport. The carrier band 22 with the integrated card-shaped data carriers 10 can stem directly from the production of the card-shaped data carriers, for example from a lamination of the layers of the card-shaped data carriers.

Figure 3B:
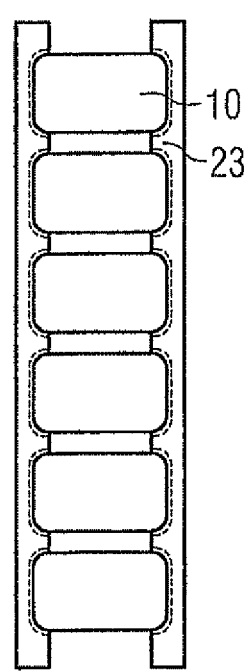

FIG. 3b shows a carrier band 23 wherein the data carriers 10 are likewise part of the carrier band 23. However, here the carrier band 23 is not configured over the full area, but only at the sides of the data carriers 10. In this case, the carrier band 23 has no indexing or transport holes. However, such holes can be provided in all embodiment examples of the carrier bands 20, 21, 22, 23. Also, the carrier bands 20, 21, 22, 23 can carry card-shaped data carriers of different format, e.g. mini-UICC, cards in the format of ID000 to ID3, including intermediate sizes, or other suitable larger or smaller formats. Thus, different card formats can be located on a carrier band 20, 21, 22, 23. Further, it is possible that at least one data carrier 10 is connected to at least one further data carrier on the carrier band 20, 21, 22, 23 by e.g. a perforation to form a lot which serves e.g. for advertising purposes, as is known of so-called gift cards, whereby the further data carrier may be personalized or not personalized. The at least one further data carrier can be arranged on the narrow and/or longitudinal side of the data carrier 10.

In FIG. 4 there is schematically represented an apparatus for personalizing card-shaped data carriers. The card-shaped data carriers to be personalized are made available on one of the described carrier bands 20, 21, 22, 23 or an arbitrary endless carrier as the carrier medium on a roller 30. Upon the material feed via the roller 30 there can be effected an input count of the card-shaped data carriers. In particular, there can be effected a good or bad parts count, which can be based, inter alia, on a marking of the bad parts, for example, that was carried out during preceding processes. Upon the production of the bodies of the data carriers there can have been effected for example a bad parts punching, i.e. data carriers already recognized as faulty upon production can have been marked for example by means of a punching in a certain form, or have been removed completely.

The endless carrier made available from the roller 30 is supplied after unrolling to a dancer control 32. Said dancer control 32 has partly shiftable rollers 35 over which the endless carrier is guided. Via the dancer control 32 the tension of the endless carrier can be kept constant. Furthermore, the dancer control 32 serves as a buffer, if disturbances occur during personalization. The dancer control 32 also serves as a buffer in the case of a band change, that is, when a new roller with data carriers to be personalized is made available, so that the processing of the card-shaped data carriers can go on continuously. The dancer control 32 has six rollers in this embodiment example, whereby the number of rollers can vary.

Figure 5:
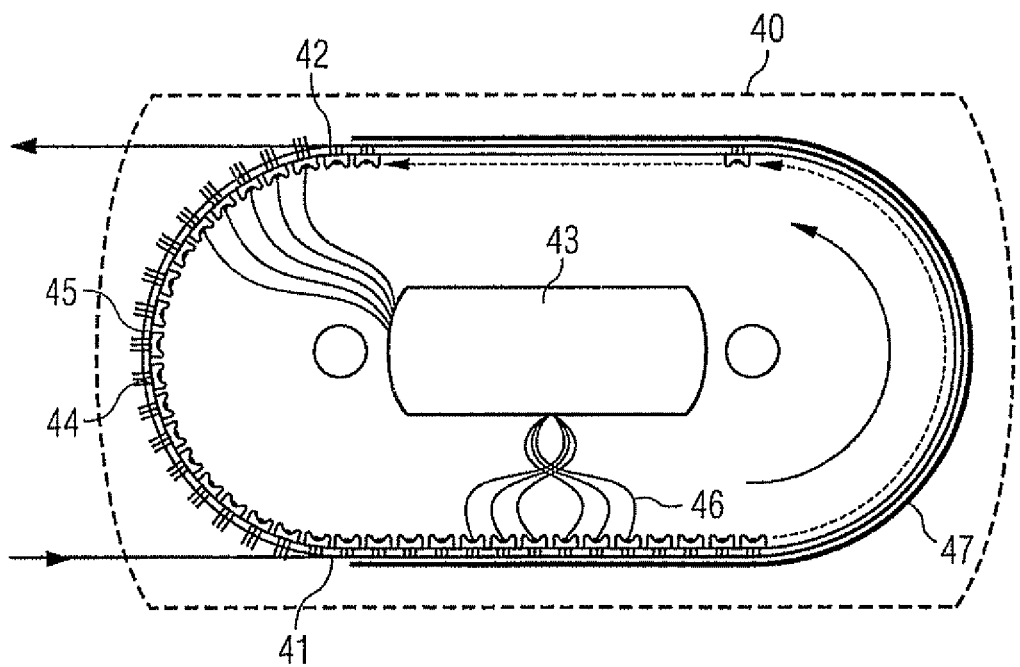

The endless carrier with the data carriers to be personalized next runs through a personalization device 40, which is schematically represented in further detail in FIG. 5. The endless carrier reaches the personalization device 40 at an entry position 41 and leaves the personalization device 40 at an exit position 42. During the transport motion from position 41 to position 42 there is effected the transfer of the personalization data to the card-shaped data carriers. For this purpose, the data carriers are contacted by interfaces 44. The interfaces 44 are arranged on an endless loop 45 in the form of a chain or a band which extends along the circumference of the personalization device 40. The communication of the interfaces 44 with the card-shaped data carriers can be effected here in contact-type or contactless fashion.

The interfaces 44 are connected via connecting lines 46 to a terminal device 43. The terminal device 43 draws the personalization data from a data source not represented, for example a central management system, a host computer or the like. The terminal device 43 also performs the control of the interfaces 44.

The chain 45 with the interfaces 44 arranged thereon moves at the same circulating speed as the endless carrier transported along on the personalization device 40. In this way the personalization data can be transferred to the card-shaped data carriers during the transport motion. The duration required for transporting the carrier band along the circumference of the personalization device 40 from the entry position 41 to the exit position 42 is sufficient for transferring the personalization data to a data carrier.

A guide 47 ensures a correct run of the endless carrier along the personalization device 40. The guide 47 can also serve as a shield in the case of a contactless transfer of the personalization data.

To decouple the rotational motion of the chain 45 from the terminal device 43, the connecting lines 46 can for example be connected to the terminal device 43 via sliding contacts. However, it is preferred that the terminal device 43 rotates in the same direction as the chain 45 and draws the personalization data from the data source (not represented) contactlessly, e.g. via an optocoupler, while the interfaces 44 are firmly wired to the terminal device 43 via the connecting lines 46.

Figure 6:
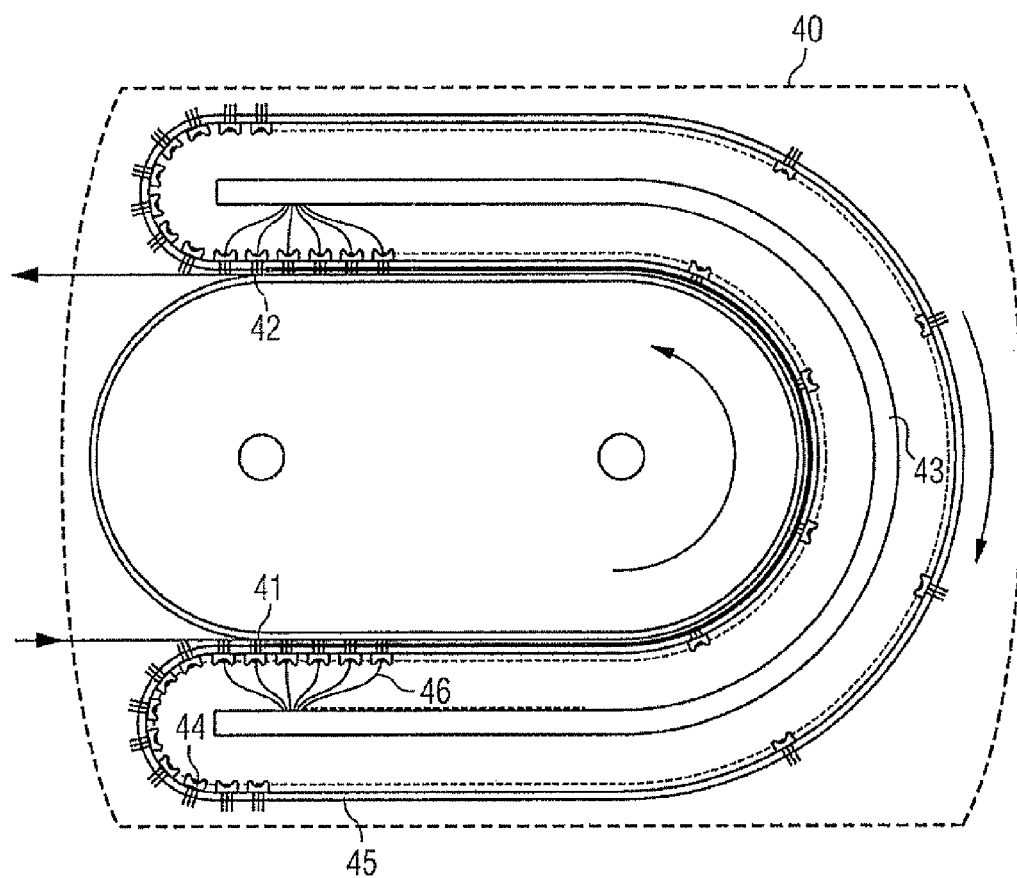

Preferably, the chain 45 with the interfaces 44 is guided within the carrier band, as represented in FIG. 5. Alternatively, the chain 45 with the interfaces 44 can also extend outside the carrier band, as represented in FIG. 6. The interfaces 44 are likewise in a communication link with the card-shaped data carriers from the entry position 41 to the exit position 42 here, to be able to transfer the personalization data.

To be able to process card-shaped data carriers of different sizes there are employed chains 45 with different pitch, that is, a different distance between the individual interfaces 44. This makes possible a high flexibility upon the processing of card-shaped data carriers of different format, since it is only necessary to change the chain 45.

In FIGS. 4 to 6, the chain 45 and the carrier band are so represented that they are perpendicular to the sheet plane. However, it is also possible that the chain 45 and the carrier band are arranged at any other suitable angle to the sheet plane. This means that for example the chain 45 can also be arranged horizontally to the sheet plane and thus the carrier band for the cards would lie on the chain 45. The same applies to all the other devices of the present apparatus for personalizing card-shaped data carriers.

After the electrical personalization in the personalization device 40 there can be provided for cards with a magnetic stripe a magnetic-stripe coding module, which is not represented. The magnetic-stripe coding module can alternatively also be integrated into the personalization device 40. Thus the magnetic stripe could be written with suitable data. In principle, no certain position within the process chain is required for the magnetic-stripe coding module, so that it can be arranged at an arbitrary place in the process chain.

As represented in FIG. 4, the endless carrier with the data carriers arranged thereon one behind the other in the transport direction passes, after the transfer of the personalization data, through a device 50 for re-producing faulty data carriers. Before and after the device 50 for re-producing faulty data carriers in the transport direction there are again arranged dancer controls 33, 34 which guarantee a constant band tension. The dancer controls 33, 34 serve, like the dancer control 32, as a buffer in the case of disturbances during personalization. The capacity of the buffer effect of the dancer controls 33, 34 is coordinated with the process speed so as to guarantee a continuous run.

In the dancer control 33 the carrier band can be clamped by means of a roller 36, so that a transport can also be effected against the actual transport direction from the device 50 for re-producing the faulty data carriers. This can be necessary in order to be able to use a re-produced data carrier in the place of the faulty data carrier.

Figure 7:
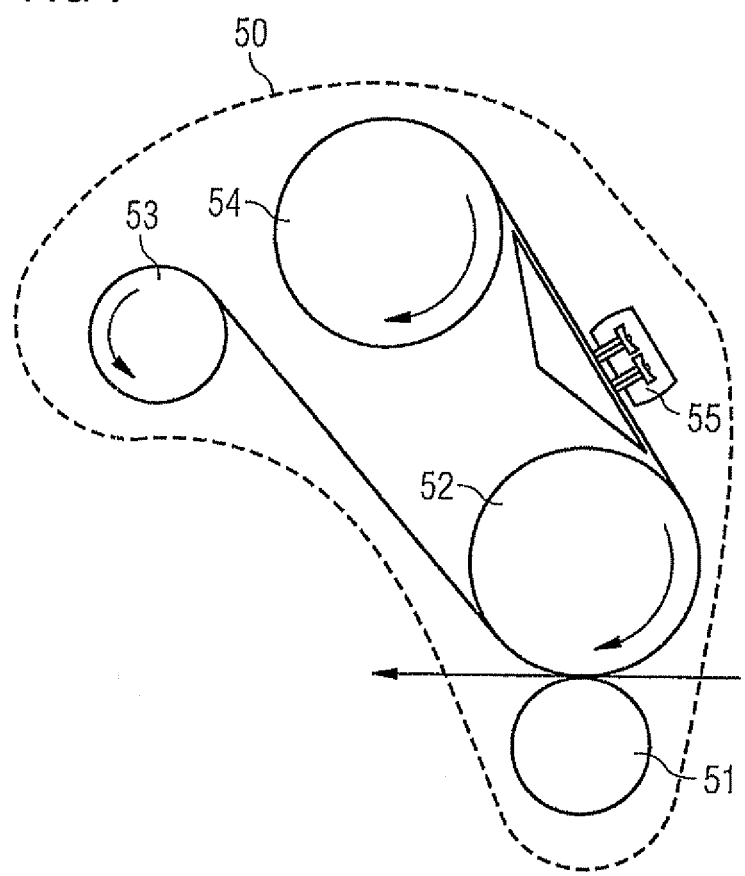

The device 50 for re-producing faulty data carriers is represented more closely in FIG. 7. By means of the device 50, data carriers recognized as defective or faulty can be removed from the endless carrier. The recognition of errors is already effected in the personalization device 40. An error can lie for example in the transfer of the personalization data, but can also be a defect of the storage device. By means of the roller 51, faulty data carriers are detached from the carrier band, for example punched out thereof. Because the position of the faulty data carrier was already recognized in the personalization device 40, the re-production of a replacement data carrier can already begin at an early time, in order to be able to perform an exchange without any great delaying of the process. Replacement data carriers are made available on the roller 54 and personalized with the correct personalization data via an interface 55. This can again be effected in contact-type or contactless fashion. The re-produced data carrier is supplied via the roller 52 to the carrier band at that place where the faulty data carrier was previously detached and carried off in the direction of the roller 53. A possible slowing down of the process can be compensated with the help of the dancer devices 33, 34 represented in FIG. 4.

In FIG. 4 there is further represented after the optical personalization a device 60 for electronic personalization. Here, information perceptible to the human eye can be applied for example by means of laser or ink jet on both sides of a card-shaped data carrier, that is, on the front side and/or back side thereof. The optical personalization data can also be applied by other printing methods, for example by digital printing or by ink dabber printing. They usually have a verifiable relation with the electronic personalization data.

The both-sided optical personalization of a data carrier can also be effected by means of a personalization unit which is arranged only on one side of the carrier band. For this purpose it is necessary to turn over the carrier band. If the optical personalization unit is arranged above or below the carrier band, the carrier band must be turned over by 180 degrees. It is also conceivable to position the optical personalization unit laterally, so that the carrier band need only be turned by 90 degrees in one and the other direction.

After the optical personalization by means of the device 60 there is effected an optical check for example by means of a camera 61. In so doing, the data carriers are inspected optically on the front side and/or back side. At this place a bar-code scanner can also be used. Upon the optical check there is effected a matching between the personalization information to be applied and the optical personalization actually carried out.

Optionally, there can be arranged for example downstream of the optical check a unit (not represented) in order to be able to apply so-called scratch labels to the data carriers. Such labels can serve for example upon the personalization of cards in the ID1 format as a cover for an applied PIN, PUK or other information, whereby the label can be scratched off or rubbed away later. Subsequent to such a device for applying a scratch label there can be provided a further device (likewise not represented) for optical inspection of the applied labels.

Subsequently, the data carriers are subjected to an electrical verification by means of a checking device 70. The checking device 70 is represented only schematically, but has in principle an analogous structure to the personalization unit 40. That is, there are provided for example interfaces which move at the same speed as the endless carrier. In the checking device 70, the personalization data previously transferred to the data carrier by means of the personalization unit 40 are read out and compared with the visually recognizable personalization information applied to the data carrier. In so doing, there is effected a check for consistency and plausibility. If the electrical and optical data are not plausible, i.e. do not match or at least partly do not match, the corresponding data carriers are sorted out.

After the check for plausibility by means of the checking device 70, the personalized card-shaped data carriers can be detached from the carrier band, for example punched out by means of a punch 81, in a singling unit 80. The punched-out data carriers are collected in a container 82 which is adapted to the size of the respective data carriers.

There can also be provided two displaceable containers, whereby one container collects the correctly personalized data carriers and the other container can collect defective or faultily personalized data carriers. In so doing, there can likewise be effected a count of the good and bad parts. In the singling unit 80 there can also be effected a sorting out of the data carriers marked as bad, defective or faulty during the process.

Further, there can be provided a device (not represented here) for turning over the data carriers detached from the endless carrier. Such a device can turn over the data carriers for example by 180° before they are deposited in the container 82. It can thereby be achieved that the data carriers are present in the desired order with a certain orientation of the stack. For example, after the stack has been removed from the container 82 and the stack has been turned over, the data carrier first deposited can thus lie on top of the stack, whereby the front sides of the data carriers simultaneously point upward.

If no detaching of the data carriers from the endless carrier in the device 80 is effected, the endless carrier with the personalized data carriers can also be wound onto a roller 31, to be able to be stored and/or supplied to a further process. If a punching out of the data carriers in the device 80 was effected, only the remnants of the endless carrier are wound onto the roller 31.

Through the transport of the card-shaped data carriers to be personalized on the endless carrier there can be effected a continuous processing of the data carriers in the described fashion. The data carriers need not be handled individually, so that high processing speeds can be attained, involving a considerable cost saving. Optical defects on the surface of the data carriers can be avoided or at least reduced. Further, this procedure allows a flexible handling of data carriers of different formats, as explained.

The invention claimed is:

1. A method for personalizing card-shaped data carriers, comprising the steps:
    transporting at least one card-shaped data carrier to be personalized, and
    transferring personalization data to an electronic storage device of the card-shaped data carrier by a personalization device during the transport motion,
    effecting the transporting of the card-shaped data carrier by a band-shaped or tubular carrier on which a multiplicity of card-shaped data carriers to be personalized are arranged one behind the other in the transport direction,
    wherein upon a faulty transferring of personalization data to one of the data carriers, said data carrier is separated from the band-shaped or tubular carrier and replaced by another data carrier to which the corresponding personalization data have been transferred correctly after a recognizing of the faulty transferring of the personalization data.

2. The method according to claim 1, wherein the card-shaped data carrier communicates in contact-type or contactless fashion with an interface of the personalization device, which moves at the same speed as the card-shaped data carrier upon the transferring of the personalization data.

3. The method according to claim 2, wherein the interface is moved in an endless loop and the band-shaped or tubular carrier is guided along the endless loop.

4. The method according to claim 1, wherein the transferring of personalization data to several of the card-shaped data carriers arranged on the band-shaped or tubular carrier one behind the other in the transport direction is effected at least partly simultaneously.

5. The method according to claim 1, including the further step of optically personalizing the card-shaped data carriers by applying visually recognizable personalization information to the card-shaped data carriers.

6. The method according to claim 5, including the further step of comparing for matches the personalization data transferred to the card-shaped data carriers with the personalization information applied to the card-shaped data carriers.

7. The method according to claim 1, wherein the band-shaped or tubular carrier has a width smaller than a width of the multiplicity of card-shaped data carriers.

8. The method according to claim 1, wherein the multiplicity of data carriers are fastened to the band-shaped or tubular carrier.

9. The method according to claim 1, wherein the multiplicity of data carriers are connected on sides of the data carriers to the band-shaped or tubular carrier.

10. An apparatus for personalizing card-shaped data carriers, comprising:
    a transport device arranged to transport card-shaped data carriers and a personalization device for transferring personalization data to an electronic storage device of the card-shaped data carriers during the transport motion,
    said transport device being configured to transport the card-shaped data carriers, upon the transferring of the personalization data, on a band-shaped or tubular carrier on which a multiplicity of card-shaped data carriers to be personalized are arranged one behind the other in the transport direction, and
    a reproducing device arranged to reproduce faultily personalized data carriers and which is arranged to separate a faultily personalized data carrier from the band-shaped or tubular carrier and to replace it by a card-shaped data carrier correctly personalized with the corresponding personalization data.

11. The apparatus according to claim 10, wherein the personalization device comprises at least one interface which is arranged to communicate with the card-shaped data carriers in contact-type or contactless fashion, and which is movable at the same speed as the card-shaped data carriers upon the transferring of the personalization data.

12. The apparatus according to claim 11, wherein the interface is movable in an endless loop and the band-shaped or tubular carrier is guidable along the endless loop.

13. The apparatus according to claim 11, wherein at least one interface is connected to a terminal device of the personalization device via sliding contacts, or that the at least one interface is firmly connected to the terminal device, wherein the terminal device is co-rotatable in the moving direction of the at least one interface and draws the personalization data from a data source via a contactless interface.

14. The apparatus according to claim 11, including an optical personalization device arranged to optically personalize the card-shaped data carriers, and which is arranged to apply visually recognizable personalization information to the card-shaped data carriers.

15. The apparatus according to claim 14, including a comparing device arranged to compare the personalization data transferred to the card-shaped data carriers for matches with the personalization information applied to said card-shaped data carriers.

16. The apparatus according to claim 10, wherein the personalization device comprises more than one interface which are configured to transfer personalization data at least partly simultaneously to several of the card-shaped data carriers arranged on the band-shaped or tubular carrier one behind the other in the transport direction.

17. The apparatus according to claim 10, wherein the band-shaped or tubular carrier has a width smaller than a width of the multiplicity of card-shaped data carriers.

18. The apparatus according to claim 10, wherein the multiplicity of data carriers are fastened to the band-shaped or tubular carrier.

19. The apparatus according to claim 10, wherein the multiplicity of data carriers are connected on sides of the data carriers to the band-shaped or tubular carrier.

* * * * *